United States Patent [19]

Hahne et al.

[11] Patent Number: 4,686,069
[45] Date of Patent: Aug. 11, 1987

[54] AIR HUMIDIFIER

[75] Inventors: Ernst A. Hahne, Allschwil; Hermann Künzig, Weil am Rhein, both of Fed. Rep. of Germany

[73] Assignee: Eltex-Elektrostatik Gesellschaft mbH, Weil am Rhein, Fed. Rep. of Germany

[21] Appl. No.: 875,264

[22] Filed: Jun. 17, 1986

[30] Foreign Application Priority Data

Jun. 26, 1985 [DE] Fed. Rep. of Germany ....... 3522882

[51] Int. Cl.⁴ ................................................. B01F 3/04
[52] U.S. Cl. .............................. 261/92; 261/DIG. 80
[58] Field of Search ...................... 261/DIG. 80, 92, 1

[56] References Cited

U.S. PATENT DOCUMENTS

| 2,001,700 | 5/1935 | Barthel | 261/DIG. 80 |
| 3,730,497 | 5/1973 | Schmitt et al. | 261/92 |
| 4,133,484 | 1/1979 | Jannone | 261/92 |

FOREIGN PATENT DOCUMENTS

| 485282 | 3/1975 | U.S.S.R. | 261/DIG. 80 |
| 596782 | 8/1978 | U.S.S.R. | 261/DIG. 80 |
| 620748 | 11/1978 | U.S.S.R. | 261/DIG. 80 |
| 928136 | 5/1982 | U.S.S.R. | 261/DIG. 80 |

Primary Examiner—Tim Miles
Attorney, Agent, or Firm—Max Fogiel

[57] ABSTRACT

The air humidifier has a blower (2), the current of air that is generated by which is blown through a plate (3) with a medium that is permeable to air and that releases moisture in order to humidify the air. An electrostatically negatively charged high-voltage electrode (5) is positioned upstream and another (4) downstream of the plate (3).

15 Claims, 5 Drawing Figures

AIR HUMIDIFIER

The invention concerns an air humidifier as in the preamble to the major claim.

An air humidifier of this type is known. A plate that rotates continuously, that partly engages a tub of water, that is provided with a medium that releases moisture, and that is permeable to air is known thereby. In operation, then, the current of air generated by a blower is blown through the plate, humidifying the air.

Air humidifiers of this type have on the whole been proven practical.

The object of the invention is to improve an air humidifier of the overall type to the extent that humid air can be ionized without leading to high concentrations of ozone.

This object is attained in an air humidifier of the overall type recited in the preamble to the major claim in accordance with the body of that claim.

The two preferably different high-voltage electrodes upstream and downstream of the plate generate an adequate and pleasant negative ionization of the air while operating surprisingly low in ozone.

Practical embodiments and developments of the invention are characterized in the subsidiary claims.

Figure 1:
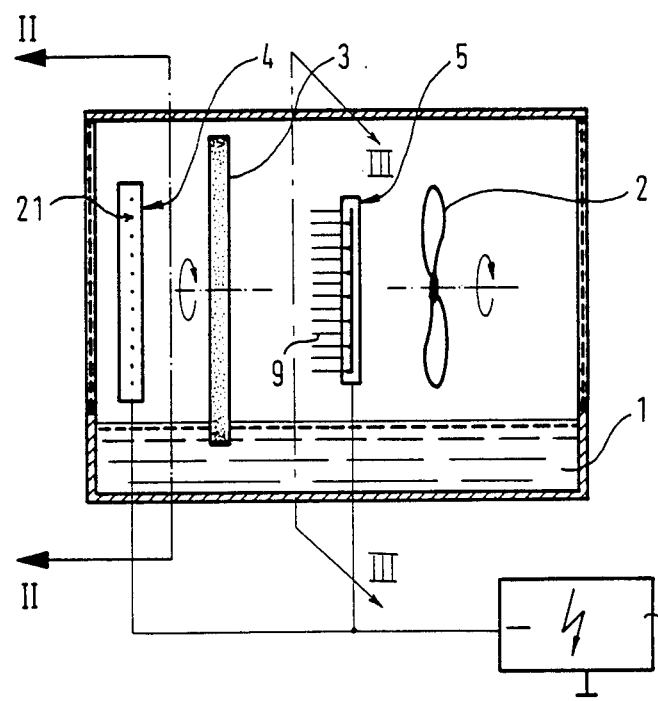
Figure 2:
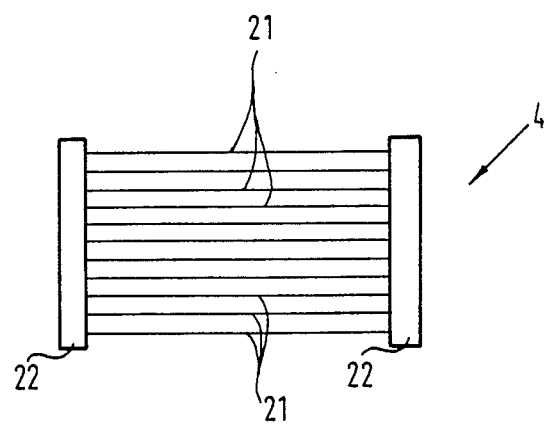
Figure 3:
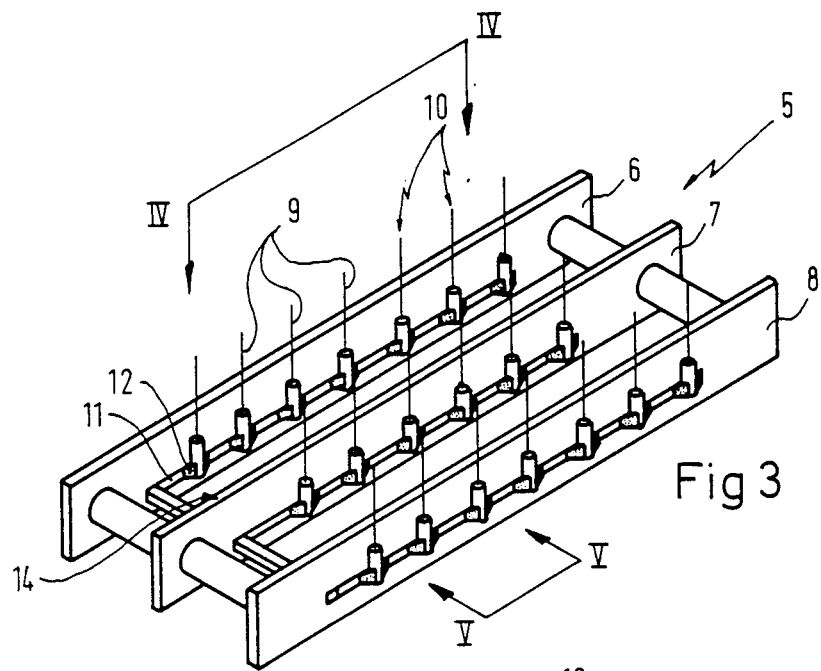
Figure 5:
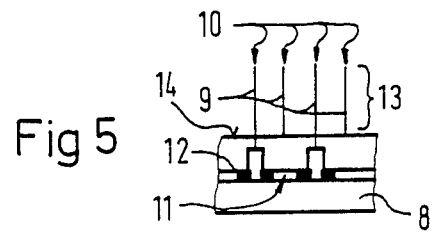
Figure 4:
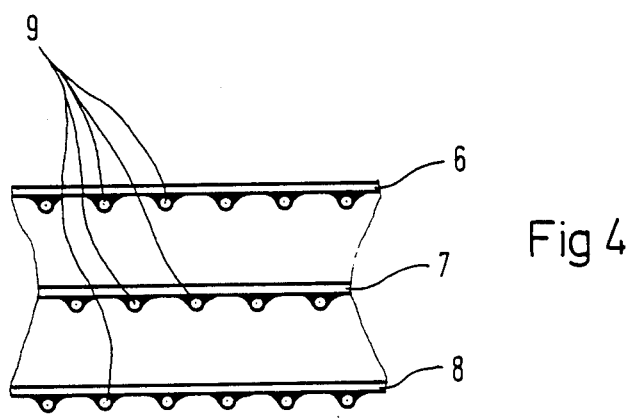

A preferred embodiment of the invention will now be described with reference to the drawings, wherein FIG. 1 is a schematic cross-section through the air humidifier, FIG. 2 is a section along the line II—II in FIG. 1, FIG. 3 is a section along the line III—III in FIG. 1, FIG. 4 is a view in the direction indicated by the double-headed arrow IV—IV in FIG. 3, and FIG. 5 is a view in the direction indicated by the double-headed arrow V—V in FIG. 3.

The air humidifier contains a tub of water 1. A blower 2 in the form of a radial fan is positioned above the tub. Downstream of blower 2 is a plate with a medium that is permeable to air and that releases moisture, preferably a porous sponge, which is slowly rotated with its bottom immersed in water 1.

Downstream of plate 3 is an electrostatically negatively charged electrode 4 and upstream of the plate another also electrostatically negatively charged electrode 5. Both electrodes are, as schematically illustrated, connected to a high-voltage generator 20 with a negative voltage of 4 to 10 and preferably 6 kV.

Rear electrode 4 has, as illustrated in FIG. 2, a number of individual electrodes in the form of parallel wires 21 that extend perpendicular to the current of air. Wires 21 are mounted and secured electrically insulated in a known way between two mounts 22.

Forward high-voltage electrode 5 consists of a number of individual electrodes 9, each with a very sharp point 10, positioned parallel to one another in three parallel rows 6, 7, and 8 in the form of printed-circuit boards. All of these are in one plane that extends perpendicular to the length of individual electrodes 9. The spaces between the electrodes 9 in one row 6 are opposite the electrodes 9 in the adjacent row 7 and vice versa. Printed-circuit boards 6, 7, and 8 are provided with a schematically illustrated printed circuit 11 with points for soldering on the individual electrodes 9 that are mounted on them. All the electrodes in one row as well as the rows themselves are connected to an unillustrated source of negative high voltage.

The ratio of the free length 13 of an individual electrode 9 (FIG. 6) that extends beyond printed-circuit board 8 to the diameter of an individual electrode is at least 50:1. Individual electrodes 9 are also separated by at least half their length and preferably by at least ⅔ of their length, which, as illustrated schematically in FIG. 2, projects perpendicularly over the longitudinal sides 14 of the whole rectangular boards 6, 7, and 8, specifically perpendicularly beyond longitudinal side 14.

We claim:

1. Air humidifier apparatus comprising: an air permeable plate unit; means for moistening said plate unit; blower means forcing air through said unit for humidifying the air; and electrostatically-negatively charged high-voltage electrodes positioned in the air stream both upstream of and downstream of said unit.

2. Air humidifier apparatus as defined in claim 1, wherein each high-voltage electrode is operated with a negative voltage from 4 to 10 kV.

3. Air humidifier apparatus as defined in claim 1, wherein each high-voltage electrode is operated with a negative voltage of substantially 6 kV.

4. Air humidifier apparatus as defined in claim 1, wherein each high-voltage electrode is different from the other electrode.

5. Air humidifier apparatus as defined in claim 1, wherein the downstream high-voltage electrode comprises a plurality of individual electrodes of mutually parallel wires positioned perpendicular to the air stream.

6. Air humidifier apparatus as defined in claim 1, wherein the upstream high-voltage electrode comprises a plurality of needle-shaped individual electrodes, each of said needle-shaped individual electrodes having a point.

7. Air humidifier apparatus as defined in claim 6, wherein all individual electrodes are non-potted, all individual electrodes having substantially identical shape and extending parallel to one another with their points in one plane, said individual electrodes having a free length and a diameter so that the ratio of the free length to the diameter is at least 50-1, said individual electrodes being arranged in similarly-shaped rows, individual electrodes in one row being positioned opposite spaces between individual electrodes in an adjacent row, said individual electrodes in said rows being spaced from each other by at least half said free length.

8. Air humidifier apparatus as defined in claim 7, wherein the ratio of said free length to said diameter of each individual electrode is between 80:1 and 120:1.

9. Air humidifier apparatus as defined in claim 8, wherein said individual electrodes are spaced apart by at least ⅔ of said length.

10. Air humidifier apparatus as defined in claim 7, including a board of electrically insulating material and being shaped as a substantially narrow rectangle, individual electrodes in one row being mounted on said board, the free length of the individual electrodes extending perpendicularly beyond a longitudinal side of said board.

11. Air humidifier apparatus as defined in claim 10, wherein said board comprises a printed-circuit board having soldering points, said individual electrodes being soldered to said soldering points.

12. Air humidifier apparatus as defined in claim 11, including a printed conductor connecting said soldering points.

13. Air humidifier apparatus as defined in claim 7, including a source of negative high voltage connected to said individual electrodes.

14. Air humidifier apparatus as defined in claim 7, wherein said plane extends perpendicular to an extension of said individual electrodes.

15. Air humidifier apparatus as defined in claim 7, wherein said points are positioned downstream with respect to said air stream and point along the direction of flow of said air stream.

* * * * *